United States Patent [19]

McKenna et al.

[11] Patent Number: 5,021,251

[45] Date of Patent: Jun. 4, 1991

[54] PROCESS FOR PRESERVING LEMON JUICE UTILIZATING A NON-SULFITE PRESERVATIVE

[75] Inventors: Ronald J. McKenna, Camillus; David J. Keller, Syracuse; Lauren S. Bibeau, LaFayette, all of N.Y.

[73] Assignee: Borden, Inc., Columbus, Ohio

[21] Appl. No.: 556,758

[22] Filed: Jul. 23, 1990

[51] Int. Cl.$^5$ ............................................. A23L 2/02
[52] U.S. Cl. .................................... 426/330.5; 426/599
[58] Field of Search ............ 426/599, 263, 268, 330.5, 426/333, 541, 235, 236

[56] References Cited

U.S. PATENT DOCUMENTS

| | | | |
|---|---|---|---|
| 1,955,864 | 4/1934 | Stevens | 426/268 |
| 2,215,334 | 9/1940 | Nelson | 426/330.5 |
| 2,367,789 | 1/1945 | Leo | 426/541 |
| 2,928,744 | 3/1960 | Ponting | 426/268 |
| 4,209,538 | 6/1980 | Woodruff | 426/333 |

FOREIGN PATENT DOCUMENTS

| | | | |
|---|---|---|---|
| 2142959 | 8/1971 | Fed. Rep. of Germany | 426/599 |
| 3003394 | 8/1981 | Fed. Rep. of Germany | 426/599 |
| 2571222 | 4/1986 | France | 426/599 |
| 5396348 | 8/1978 | Japan | 426/330.5 |
| 60-221066 | 11/1985 | Japan | 426/268 |

*Primary Examiner*—Carolyn Paden
*Attorney, Agent, or Firm*—Kenneth Van Wyck; Dennis H. Rainear

[57] ABSTRACT

The invention relates to a process for preserving lemon juice without the use of sulfite agents. The process uses sodium benzoate and optionally ascorbic acid, glucose oxidase, sodium acid pyrophosphate, or sodium hexametaphosphate, or an inert gass, such as carbon dioxide, helium or nitrogen or any combination thereof. Non-refrigerated shelf-life of 12 months or more before browning occurs is thereby achieved.

6 Claims, No Drawings

PROCESS FOR PRESERVING LEMON JUICE UTILIZATING A NON-SULFITE PRESERVATIVE

FIELD OF THE INVENTION

The invention relates to a method for preserving lemon juice without the use of sulfiting agents.

BACKGROUND OF THE INVENTION

There has long been a need for the preservation of citrus juices, and many methods and additives have been used. Citrus juices are known to develop a brown or dark color in a relatively short period of time when exposed to air, due at least in part to oxidative changes. However, browning of citrus juices can also occur in the absence of air. The browning in citrus juices, and lemon juice in particular, is a complicated reaction that is both enzymatic, non-enzymatic, aerobic, anaerobic and is influenced by temperature, oxygen, amino acids, metal catalysts, pH, ascorbic acid content and sugar concentrations. Previous efforts to reduce or eliminate browning include ascorbic acid addition, addition of sulfiting agents, such as sulfur dioxide, and exposure to stannous ions, either from packaging in containers with exposed tin surfaces, or by the addition to the juice of a source of stannous ions. Ascorbic acid addition alone is not always effective and can even promote rather than retard browning in concentrated lemon juice. Addition of ascorbic acid-2-phosphate esters and ascorbyl-6-fatty acid esters is also known.

Sulfites, such as sodium bisulfite, have recently been the subject of scrutiny by health officials, and may be the cause of allergic-type reaction by people eating foods treated with sulfites. Asthmatic sufferers are known to exhibit anaphylactic shock upon exposure to sulfites.

Therefore, a need exists for a method to preserve for several months citrus juices, such as lemon juice, without refrigeration or use of sulfites.

SUMMARY OF THE INVENTION

The invention relates to a process for preserving lemon juice in the absence of sulfite agents comprising (a) mixing lemon concentrate and/or lemon oil, sodium benzoate and water to produce a lemon juice, (b) adding with stirring ascorbic acid, sodium acid pyrophosphate, glucose oxidase, or sodium hexametaphosphate, and (c) adding an inert gas to the product of step (b). In this manner is produced a lemon juice which exhibits nonrefrigerated shelf-life exceeding nine months, and preferably exceeding twelve months, as evidenced by inhibition of browning of the lemon juice.

DETAILED DESCRIPTION OF THE INVENTION

It is a surprising feature of the present invention that by combining certain known food preservative techniques, a significant, unexpected, and unobvious enhancement of shelf stability of lemon juice in the absence of sulfite agents is obtained.

According to one embodiment of the present invention, lemon juice is mixed with sodium benzoate and an appropriate amount of a material selected from the group consisting of ascorbic acid, sodium hexametaphosphate, sodium acid pyrophosphate, and glucose oxidase, after which the solution optionally may be carbonated, whereby a lemon juice is obtained which exhibits nonrefrigerated shelf-life exceeding one month as evidenced by inhibition of browning of the lemon juice. In a preferred embodiment of the present invention, the nonrefrigerated shelf-life of the lemon juice exceeds twelve months.

In one embodiment of the present invention, ascorbic acid, also known as vitamin C, is mixed with water, sodium benzoate and lemon concentrate and/or lemon oil to produce a lemon juice. By "lemon juice" herein is meant the unfermented liquid extract obtained by mechanical process from mature lemons (*Citrus limon*) from which seeds and excess pulp are removed. By "lemon concentrate" herein is meant lemon juice from which part of the water has been removed. By "lemon oil" herein is meant lemon oil and lemon essence derived from lemon. The juice may be adjusted by the addition of optional ingredients and food additives known to those skilled in the art.

In a preferred embodiment, the ascorbic acid is added to the lemon concentrate, lemon oil and water at a level not exceeding about 50% of the USRDA, or about 33 milligrams per one fluid ounce serving. Higher levels of ascorbic acid are operative but less preferred because it is noted that levels of, for example, 100% of the USRDA result in a reduction of the period of time before browning occurs. Thus a preferred range of added ascorbic acid concentration exists where the inhibition of browning is maximized. This preferred range is from 20 to 40 milligrams of added ascorbic acid per one fluid ounce serving.

The vitamin C can be dispersed or dissolved in the lemon concentrate, or in the lemon oil, or in the water, or added to the mixture of lemon concentrate, lemon oil and water. The preferred method is to add the vitamin C to the mixture with stirring. The temperature of the mixture during the addition of vitamin C is not critical and a preferred range is from 12.7° C. to 23.9° C.

The next step of the process of one embodiment of the present invention is the addition to the lemon juice and vitamin C mixture of sodium benzoate. The sodium benzoate is useful as, among other things, a mold inhibitor. Potassium benzoate did not provide shelf life exceeding 175 days, and therefore sodium benzoate is preferred. It is preferred that the sodium benzoate be added at a level exceeding 250 parts per million and not exceeding 1200 parts per million. A more preferred level of sodium benzoate is about 1000 parts per million. The sodium benzoate is added with stirring by any suitable means. It is especially useful in the present invention to dissolve the sodium benzoate in water first and then carbonating this mixture. This carbonated water is then discharged into bottles containing the concentrated lemon oil, and vitamin C. This method reduced the foaming otherwise obtained.

In an alternative embodiment, along with sodium benzoate is added sodium acid pyrophosphate. In this embodiment, the preferred level of sodium acid pyrophosphate is from 750 to 1200 ppm. In yet another alternative embodiment is used sodium hexametaphosphate in conjunction with sodium benzoate, at a level from 750 to 1200 ppm. Glucose oxidase, an enzyme, can also be used with the sodium benzoate. Enzymes are sold and used on the basis of "units of activity" defined as the ability of the specific enzyme to perform a function under a defined set of optimal conditions. In the present invention, the presence of glucose oxidase in the lemon juice will enhance the preservative effect of the sodium benzoate by scavenging oxygen.

In another embodiment of the invention, the mixture containing ascorbic acid and/or sodium benzoate, lemon oil, lemon concentrate, and water is deaired by the addition of an inert gas such as $CO_2$, helium, or nitrogen. The inert gas can be added by any conventional means including but not limited to injection, gas diffusing, bubbling and known carbonating techniques. A preferred means of adding the inert gas is carbonation produced by bubbling $CO_2$ via a gas loop into a closed vessel containing the mixture described above. An increase in pressure to a level of, for example, 3.45 bar is preferably achieved within the closed vessel. The preferred amount of $CO_2$ added is greater than 1.5 volumes of $CO_2$ relative to the volume of the mixture. A more preferred level of $CO_2$ exceeds 1.8 volumes of $CO_2$ relative to the volume of the mixture. The $CO_2$ can be bubbled through the mixture or preferably an Excelall Carbonator device (available from the Bastian-Blessing Co. of Chicago, Ill.) is used to add 1.7 to 2.05 volumes of $CO_2$.

When vitamin C at levels of 100% USRDA is used in lemon juice without sulfite agents and without $CO_2$ or with reduced levels of sodium benzoate, the browning indicative of product failure is inhibited at 70°, 40% RH for 168 days. The preservative effect is enhanced to over 260 days at lower levels of vitamin C, i.e., 20–40 milligrams per fluid ounce of lemon juice. When $CO_2$ at levels of 1.90 volumes is used without vitamin C or with reduced levels of sodium benzoate, the browning is inhibited at 70°, 40% RH for over 266 days. When sodium benzoate at levels of 1000 ppm is used without vitamin C or $CO_2$, the browning is inhibited for 322 days. Combining sodium benzoate, sodium hexametaphosphate, vitamin C and $CO_2$ extended the shelf life beyond 365 days at 70° F. and 40% RH. The Examples below illustrate several embodiments of the present invention where shelf life beyond 1 year is achieved. This information and various subcombinations of the invention are shown in Table I.

The following examples are provided by way of illustration only and are not representative of limitations of the invention. Modifications and variations of the present invention will be obvious to those skilled in the art and are deemed to be included in the scope of the appended claims.

EXAMPLE 1

Lemon concentrate, 390 grams per liter, obtained from Sunkist, of Indio, Calif., was charged to a clean stainless steel cold water-jacketed kettle. An Argentinian lemon oil, 1.71 milliliters, obtained from Citrus and Allied of Floral Park, N.Y., was added and the mixture was stirred for about 5 minutes. Sodium benzoate, 9.74 grams, obtained from Pfizer, was dispersed in 25 milliliters of water to produce a slurry which was then added with stirring to the mixture of lemon concentrate and lemon oil. The resulting mixture was stirred at 15.5° C. for 5 minutes. Carbon dioxide was then introduced into the kettle by means of an Excelall Carbonator device, available from Bastian-Blessing Co, of Chicago, Ill. $CO_2$ was added at 2.00 volumes or 0.69 bar and the vessel held at that pressure for about 2 minutes. The pressure was then released and the contents of the vessel discharged into bottles which were then immediately capped. The capped bottles were then put in storage under conditions of 100° F. and 0%RH, or 86° F. and 0%RH, or 70° F. and 40%RH. Time to failure was then recorded, where failure was indicated by dark coloration, or heavy sediment formation, or off flavor. The samples produced by this example exhibited shelf-life failure of 91 days at 100° F. and 0%RH; 119 days at 86° F. and 0%RH; and 336 days at 70° F. and 40%RH.

EXAMPLE 2

The procedure of Example 1 was repeated except that the sodium benzoate slurry was used in conjunction with a slurry of sodium hexametaphosphate, 9.74 grams in 100 milliliters of water. It was necessary to warm the water to 15.5° C. with stirring to prepare the sodium hexametaphosphate slurry. The slurry was added to the lemon oil and lemon concentrate mixture as in Example 1. The samples produced by the example exhibited shelf-life to failure of 91 days at 100° F. and 0%RH; 119 days at 86° F. and 0%RH. The samples did not fail after 364 days at 70° F. and 40%RH.

EXAMPLE 3

The procedure of Example 1 was repeated using 30 milligrams of vitamin C per fluid ounce of lemon juice and the closed system was flushed for five minutes with carbon dioxide. Samples had not failed for color or flavor after 41 weeks of testing conditions at 70° F. and 40% RH.

EXAMPLE 4

The procedure of Example 1 was repeated except without carbon dioxide, and using 1000 ppm of sodium benzoate. Samples had not failed for color or flavor after 38 weeks of testing conditions at 70° F. and 40% RH.

EXAMPLE 5

The procedure of Example 1 was repeated using 1000 ppm of sodium benzoate, carbon dioxide treatment, and adding 30 milligrams of vitamin C per fluid ounce of juice. Samples did not fail after 38 weeks at 70° F. and 40% RH.

EXAMPLE 6

The procedure of Example 4 was repeated using 1000 ppm sodium benzoate, 500 ppm ascorbyl palmitate from EM Industries Inc., Hawthorne, N.Y., 250 ppm cinnamic acid also from EM Industries, Inc., and no carbon dioxide treatment. All samples passed 38 weeks at 70° F. and 40% RH.

EXAMPLE 7

The procedure of Example 6 was repeated using the carbon dioxide treatment of Example 1. All samples passed 38 weeks at 70° F. and 40% RH.

EXAMPLE 8

The procedure of Example 1 was repeated using 1000 ppm sodium benzoate, glucose oxidase (ASGO 5×1500 from Finn Sugar Biochemicals Inc., Schaumburg, Ill.) at one half unit activity per fluid ounce, and the carbon dioxide treatment. All samples passed 38 weeks at 70° F. and 40% RH.

EXAMPLE 9

The procedure of Example 8 was repeated except using the glucose oxidase at two-thirds unit activity per fluid ounce. All samples passed 38 weeks at 70° F. and 40% RH.

EXAMPLE 10

The procedure of Example 4 was repeated using 1000 ppm sodium benzoate, 100 ppm of ficin (a proteolytic enzyme from figs available from BioCon Inc., Lexington, Ky.) and no carbon dioxide treatment. All samples passed 38 weeks at 70° F. and 40% RH.

EXAMPLE 11

The procedure of Example 1 was repeated using 1000 ppm sodium benzoate, 30 ppm Na/Ca EDTA available from Dow Chemical Co., Midland, Mich. and 0.008 volume percent lemon oil and no carbon dioxide treatment. All samples passed 52 weeks at 70° F. and 40% RH.

EXAMPLE 12

The procedure of Example 1 was repeated using 1000 ppm sodium benzoate, adding 1000 ppm sodium hexametaphosphate, and 0.008 volume percent lemon oil. All samples passed 52 weeks at 70° F. and 40% RH.

EXAMPLE 13

The procedure of Example 1 was repeated using 1000 ppm sodium benzoate, 1000 ppm sodium acid pyrophosphate, 0.008 volume percent lemon oil and carbon dioxide treatment by Excelall carbonator. All samples passed 52 weeks at 70° F. and 40% RH.

EXAMPLE 14

The procedure of Example 1 was repeated using 1000 ppm sodium benzoate, 250 ppm gluconic delta lactone obtained from Roquette Corporation, Gurnee, Ill. 0.008 volume percent lemon oil, and carbon dioxide treatment by the Excelall carbonator. All samples passed 52 weeks at 70° F. and 40% RH.

EXAMPLE 15

The procedure of Example 14 was repeated using 500 ppm gluconic delta lactone. All samples passed 52 weeks at 70° F. and 40% RH.

EXAMPLE 16

The procedure of Example 1 was repeated using 1000 ppm sodium benzoate, 0.008 volume percent lemon oil, and carbon dioxide treatment with the Excelall carbonator. All samples passed 52 weeks at 70° F. and 40% RH.

EXAMPLE 17

Sodium benzoate was added to water to attain a level of 1000 ppm and this solution was carbonated by means of the Excelall Carbonator. The carbonated water was then discharged into bottles containing lemon oil, lemon concentrate, and vitamin C (35 milligrams per fluid ounce). All samples passed 52 weeks at 70° F. and 40% RH.

CONCLUSION

The process of the present invention provides a preservative technique for lemon juice which does not rely on sulfites. Non refrigerated shelf-life lemon juice is obtained which exceeds the shelf-life obtained by previously known non-sulfite preservation techniques.

That which is claimed is:

1. A process for preserving lemon juice in the absence of a sulfite agent which process comprises mixing sodium benzoate and lemon juice with one or more materials selected from the group consisting of ascorbic acid, glucose oxidase, sodium hexametaphosphate, sodium acid pyrophosphate, helium, and nitrogen, wherein the sodium benzoate is added to the lemon juice in amount of from 250 to 1200 ppm, and wherein carbon dioxide is then bubbled through the juice, wherein said lemon juice is produced in the absence of a sulfiting agent.

2. A process for preserving lemon juice in the absence of a sulfite agent comprising:
   (a) mixing ascorbic acid, lemon concentrate and water to produce a lemon juice;
   (b) adding with stirring sodium benzoate and either sodium acid pyrophosphate or sodium hexametaphosphate; and
   (c) adding an inert gas to the product of step (b), wherein the ascorbic acid and sodium benzoate are added at levels sufficient to enhance the inhibition of browning of the lemon juice, and whereby a sulfite-free juice is obtained which exhibits non-refrigerated shelf-life exceeding one month, as evidenced by inhibition of browning of the lemon juice.

3. The process of claim 2 wherein the total concentration of ascorbic acid in the lemon juice is from 20 to 40 milligrams per fluid ounce.

4. The process of claim 2 wherein the sodium acid pyrophosphate is added to the lemon juice at a level of 750 to 1200 parts per million.

5. The process of claim 2 wherein the sodium hexametaphosphate is added to the lemon juice at a level of 750 to 1200 parts per million.

6. The process of claim 2 wherein the shelf-life at about 70° F. and 40% RH exceeds 10 months.

* * * * *